Patented Feb. 12, 1924.

1,483,136

UNITED STATES PATENT OFFICE.

JOHN WALSH, OF PRIDES CROSSING, MASSACHUSETTS.

COMPOSITION FOR PAINT.

No Drawing.    Application filed December 14, 1922.   Serial No. 606,962.

*To all whom it may concern:*

Be it known that I, JOHN WALSH, a citizen of the United States, residing at Prides Crossing, in the county of Essex and State of Massachusetts, have invented new and useful Improvements in Composition for Paint, of which the following is a specification.

This invention relates to an improved composition for coating glass and is particularly adapted and intended to be used for coating the glass of greenhouses.

The requirements of a practical composition for this purpose are as follows:—It is desirable that the composition shall be in the form of a powder which can be mixed with water in order to form the coating composition, whereby the same may be shipped to the customer in comparatively small bulk and the customer can dissolve the powder in water in such quantities as he may need to use. It is desirable, also, that the same shall be noninflammable and that when it is dissolved in the water ready for use, it can be easily and quickly applied over a large surface and which when so applied will dry quickly.

Furthermore, it is desirable that the composition when so applied will not be cracked by the intense heat of the sun's rays in the summer time and will not be removed by rain, and which will allow the necessary amount of light to pass through it, in order that plants, flowers and the like, in the greenhouse may be developed under the most favorable conditions.

It is further very desirable in a composition of this character that it should be capable of being easily removed from the surface of the glass when so desired, as in the winter time it is very desirable that all the light from the sun's rays may be allowed to pass through the glass in order that the flowers and plants in the greenhouse may thrive.

Another very important requirement of a composition of this character is that it can be applied either with a brush or sprayed upon the surface of the glass, and that while it cannot be washed off by rain, yet that it shall be capable of being easily removed by rubbing the same with a damp cloth.

The composition of this invention fulfills all of these requirements.

The invention consists in the composition containing the ingredients set forth in the following specification and particularly of the ingredients and proportions of ingredients set forth in the claims.

The composition is made by mixing together ground gelatin, powdered starch and whiting, preferably Paris whiting, in the following proportions:—Four ounces of ground gelatin, six ounces of powdered starch and six ounces of whiting. These ingredients are placed in a sifter and well mixed together. After being mixed together in the proportions set forth, the composition is placed in two quarts of hot water and well stirred until all of the ingredients are dissolved, then two quarts of cold water are added, making substantially a gallon of liquid compound.

This compound has been found by practical use to be efficacious for the purpose for which it is intended. It can be spread upon the glass with a brush or sprayed upon the glass as desired and when sprayed upon the glass, the glass takes on the appearance of ground glass. When it is desired to remove the compound from the glass, it can be readily done by means of a wet or damp cloth.

I claim:—

1. A composition comprising ground gelatin, powdered starch and Paris whiting mixed together in substantially the proportions designated.

2. A composition comprising the ingredients and in substantially the proportions as follows:—4 ounces of ground gelatin, 6 ounces of powdered starch and 6 ounces of whiting, thoroughly mixed together.

3. A composition for coating glass comprising the ingredients and in substantially the proportions as follows:—4 ounces of ground gelatin, 6 ounces of powdered starch, 6 ounces of whiting, mixed together and dissolved in approximately one gallon of water.

In testimony whereof I have hereunto set my hand in presence of two subscribing witnesses.

JOHN WALSH.

Witnesses:
CHARLES S. GOODING,
FRANKLIN E. LOW.